(12) United States Patent
Shishikura et al.

(10) Patent No.: US 6,290,402 B1
(45) Date of Patent: Sep. 18, 2001

(54) OPTICAL TRANSMISSION MODULE FOR ACHIEVING AN OPTIMUM OPTICAL CONNECTION AND USEFUL FOR HIGH DENSITY MOUNTING

(75) Inventors: Masato Shishikura, Hachiouji; Toshinori Hirataka, Yokohama; Kouji Yoshida, Kokubunji; Kimio Tatsuno, Tokyo, all of (JP)

(73) Assignee: Hiatchi, Ltd., Tokyo (JP)

( * ) Notice: Subject to any disclaimer, the term of this patent is extended or adjusted under 35 U.S.C. 154(b) by 0 days.

(21) Appl. No.: 09/357,394

(22) Filed: Jul. 20, 1999

(30) Foreign Application Priority Data

Jul. 21, 1998 (JP) .................................................. 10-221015

(51) Int. Cl.⁷ ...................................................... G02B 6/36
(52) U.S. Cl. .................................................. 385/88; 385/92
(58) Field of Search ........................................ 385/88–94

(56) References Cited

U.S. PATENT DOCUMENTS 5,973,862 * 10/1999 Hashizume ........................... 385/93 X
6,141,471 * 10/2000 Agatsuma ............................ 385/88 X
6,170,996 * 1/2001 Miura et al. ............................ 385/94

OTHER PUBLICATIONS

K. Kurata et al, A Surface Mount Single–Mode Laser Module Using Passive Alignment, IEEE Transactions on Components, Packaging, and Manufacturing Technology–Part B, vol. 19, No. 3, pp. 524–531, Aug. 1996.

* cited by examiner

Primary Examiner—Phan T. H. Palmer
(74) Attorney, Agent, or Firm—Mattingly, Stanger & Malur, P.C.

(57) ABSTRACT

An optical transmission module or an optical module has a receptacle attached adjacent to an optical component module or package, and a plug configured to connect vertically with the receptacle from above the module. The outer peripheral shape of the housing is designed to fit within an area of the receptacle that faces upwardly to receive the plug in an insertion direction extending vertically downwardly. In the housing of the plug, a ferrule is attached to an end of an optical fiber and a sleeve covers the optical fiber and the ferrule. A knob is used for moving the optical fiber, the sleeve and the ferrule in the lightwave propagation direction, which is transverse to the plug insertion direction. Before connecting the plug, the knob is retracted to pull the ferrule and the sleeve within the plug housing. This prevents contact of the ferrule in the plug with a mating ferrule in the optical component package that extends into the receptacle in optical alignment therewith when the plug is seated within the receptacle. The ferrule in the optical component package is connected to an optical component via another optical fiber. Upon completion of the insertion of the plug, the knob is released and the force of a spring holds the ferrules in contact with on another with sufficient force to maintain a detachable optical connection.

17 Claims, 2 Drawing Sheets

OPTICAL TRANSMISSION MODULE FOR ACHIEVING AN OPTIMUM OPTICAL CONNECTION AND USEFUL FOR HIGH DENSITY MOUNTING

BACKGROUND OF THE INVENTION

1. Field of the Invention

The present invention relates to an optical transmission module or an optical module. In particular, the invention relates to an optical transmission module or an optical module having an optical connector mechanism.

2. Description of the Related Art

Optical communications systems for communications networks having a large capacity of data transmission have been developed for wide spread use and will continue to be further developed in the future considering the demand for multimedia in society.

Communications systems include optical transmission modules or optical modules that are placed in an optical network unit of an optical transmission network. However, since such optical transmission modules or optical modules are expensive, it is desirable to reduce their cost. One of the reasons why such modules are so expensive is that the conventional optical transmission modules or optical modules are pigtail type modules which cannot be readily detached from the optical fiber. Once the optical fiber is attached to the optical transmission module or optical module, it is difficult to perform reflow soldering and to handle the optical fiber itself.

Optical transmission modules or optical modules in which the optical fiber is capable of being detached have been proposed. For instance, a surface mountable optical module having a simple type optical connector structure to which an optical fiber is able to be attached is described in IEEE Transactions on Components, Packaging, and Manufacturing Technology-Part B, Vol. 19. No. 3, pp. 524–531, August 1996. This simple type of optical connector includes an optical connector pigtail for the optical fiber and. a receptacle that receives the connector positioned at the edge of the optical module.

By using an optical module having an optical connector structure from which the optical fiber connector can be detached, it becomes relatively simple to perform reflow soldering and handling of the optical module, followed by connection of the optical fiber to the module. The cost of the optical module is also reduced by employing such type of optical connector structure.

SUMMARY OF THE INVENTION

However, in the conventional art, it is necessary to provide sufficient space along the surface of the mounting board adjacent to the receptacle at the edge of the optical module for connecting the optical fiber connector. The reason the space is provided is because the direction of movement of the connector with respect to the receptacle of the module is in parallel with the mounting board surface of the optical module. Since it is necessary to maintain such a space adjacent the module for the connector, other chip components cannot be mounted in the space. Therefore, in the conventional art, a problem arises in that it is difficult to mount several kinds of components on a board in order to achieve high density of the components or to mount the optical module on a central portion of the mounting board.

Accordingly, an object of the present invention is to solve the problem of the conventional art by providing an optical transmission module or optical module suitable for high density mounting.

Another object of the present invention is to provide an optical transmission module or optical module having an optical active component with a receptacle prepared at one edge of the optical module for receiving a plug to which an optical fiber is connected. The connection of the receptacle and the plug can be made in a detachable manner from above the module so that the plug is optically coupled with the optical module active component after mounting of the module on a mounting board or surface.

The optical components mounted in the optical module include an optical fiber, an optical waveguide, an optical device, etc. The housing of the module has a receptacle that is shaped to mechanically fit with the housing of the plug. Further, the plug includes a mechanism to move the optical fiber back and forth with respect to the plug.

In a circuit board having the optical transmission module or optical module of the invention mounted thereon, a plurality of electronic components can be placed peripherally around the optical transmission module or optical module, and it is still possible to detach the plug from the receptacle.

An optical connector relating to the present invention includes a receptacle having a first optical fiber extending to an edge of the optical module with a ferrule and a plug to which a second optical fiber is connected that is shaped to fit within with the receptacle in a detachable manner from above the receptacle. In particular, the plug is configured to hold the second optical fiber for optically connecting it with the first optical fiber. The plug preferably includes a mechanism for moving the second optical fiber with respect to the plug in the direction of lightwave propagation of the module. Such a mechanism may include a knob attached to a ferrule to which the second optical fiber is fixed and a resilient member (e.g., a spring) biasing the movement of the knob toward a position in which the ferrule of the plug engages a ferrule of the module.

Additionally, the present invention provides a method for connecting an optical connector for an optical fiber to a component. The method involves the use of a connector mounted to an optical fiber, such as a plug. The plug has a configuration or shape that interfits with the receptacle from above the module when the plug is pushed or placed in the receptacle. The optical fiber passes through the housing of the plug to the outside of the housing and is optically coupled to the tip of the first optical fiber installed in the receptacle after the plug and receptacle have been fit together. The method also provides for detaching the optical connector or plug from the receptacle by first withdrawing the ferrule of the plug from optical engagement with the ferrule of the receptable and then detaching the plug from the housing of the receptacle by removing it therefrom in an upper direction.

Through the aforementioned, a high density mounting of the optical transmission module or optical module can be realized.

BRIEF DESCRIPTION OF THE DRAWINGS

The embodiments of the present invention are described below in conjunction with the figures, in which.

DESCRIPTION OF THE PREFERRED EMBODIMENT

A description will be given of the present invention by reference to the accompanying drawings.

Figure 1:
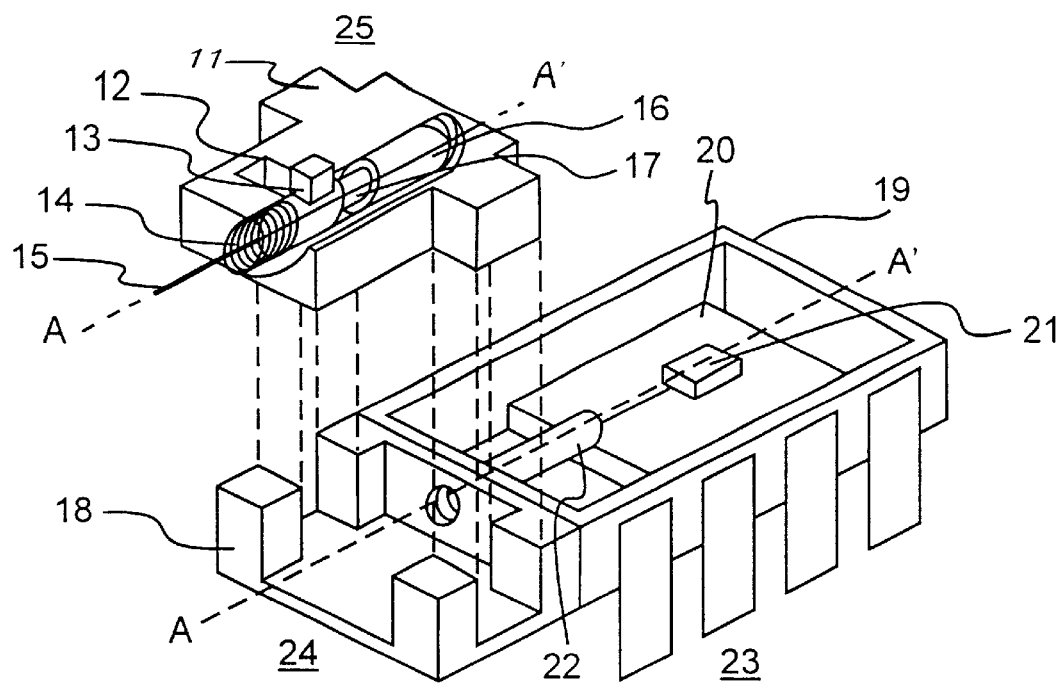
FIG. 1 shows a diagram of an embodiment of an optical transmission module or an optical module of the present invention.

FIG. 1 shows an optical transmission module or an optical module 23 of the present invention that includes an optical component module with a receptacle 24 at one side or end of the module 23 and a plug 25 configured to receive the receptacle 24. The receptacle 24 has a partially open top or area facing upwardly that is open to receive the plug as shown by the projection lines in FIG. 1, which shows the preferred embodiment of the optical connector of the present invention.

As shown in FIG. 1, plug 25 is inserted into the receptacle 24 from above the module or otherwise lowered downwardly into the receptacle from an upper direction. The plug 25 is housed in a housing structure 11 that has a cross-shaped or t-shaped guidance structure that mates with the shape of the upwardly facing open area of the receptacle 24. In the housing 11 of the plug, a ferrule 17 is attached to the end of an optical fiber 15 for establishing an optical connection. Optical fiber 15 exists the housing 11 in a longitudinal direction generally extending in alignment with the lightwave propagation direction or otherwise in a direction transverse to that of the insertion direction of the plug 25 into the receptacle 24. A sleeve 6 prevents optical misalignment and covers the optical fiber 15 and the ferrule 17.

A knob 13 that is part of a retraction mechanism in plug 25 enables the optical fiber 15 to be moved within the housing 11 in conjunction with the sleeve 16 and the ferrule 17 in the lightwave propagation direction. A knob guidance groove 12 is provided for guiding the movement of and holding the knob 13 in the retracted position. The knob 13 is secured to ferrule 17. A spring 14 pushes against knob 13 to bias the knob, optical fiber 15 and ferrule 17 in the lightwave propagation direction or toward the optical component in the optical component module. The spring, as to be explained hereinafter, provides sufficient force to establish the contact pressure necessary to achieve optical connection between the ferrule 17 of the plug 25 and a ferrule 22 of the optical component module.

The outer periphery of the plug housing 11 is dimensioned and shaped to fit into the upwardly facing open area of the receptacle. At the time of insertion, the knob 13 is pulled back along knob guidance groove 12. Therefore, the sleeve 16 is retracted and stored within the housing 11 so as to avoid contact with the housing 18 at the time of insertion.

The receptacle 24 has a housing structure 18. Receptacle 24 is positioned at one end of a side of the module 23, adjacent to an optical component module or package 19. A V-grooved silicon optical bench 20 is placed in the package 19 along with a combined optical fiber with ferrule 22 that is fixed on the substrate 20. An optical device 21 is optically coupled with the optical fiber with ferrule component 22 and is also mounted on the substrate 20. Although the optical device 21 is, according to a preferred embodiment of the present invention, a semiconductor laser diode, other optical devices, such as a photo-diode may be used.

Figure 2A:
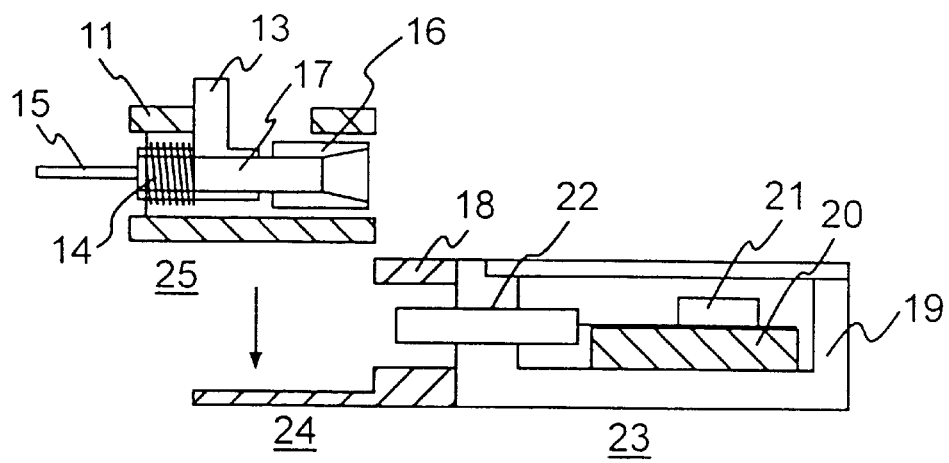
FIG. 2A shows a sectional diagram of the module taken along line A—A' shown in FIG. 1, before inserting a plug side of housing 11 into a receptacle side of housing 18.
Figure 2B:
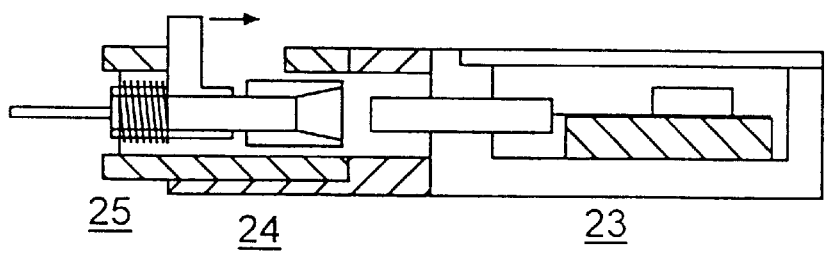
FIG. 2B shows a sectional diagram of the module taken along line A—A' shown in FIG. 1, where a plug side of housing 11 is connected with a receptacle side of housing 18.
Figure 2C:
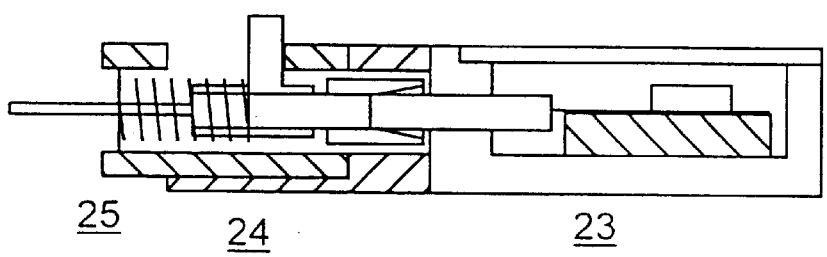
FIG. 2C shows a sectional diagram of the module taken along line A—A' shown in FIG. 1, with the plug and receptacle being optically connected.

FIGS. 2A through 2C show a sectional view of the optical module 23 taken along line A—A' shown in FIG. 1. FIG. 2A shows the plug 25 and receptacle 24 just before inserting the plug into the receptacle. At the time of insertion, a knob 13 is pulled back against the force of the spring (to the left side of the figure, as shown) and is positioned within knob guidance groove 12 of FIG. 1. In this position, sleeve 16 is stored completely or fixed within housing 11 and plug 25 is able to be pushed down vertically into receptacle 24 through the upwardly facing open area or top of the receptacle to become seated within the receptacle. That is, the plug housing 11 mates with receptacle 25 when pushed into the receptacle in an insertion direction extending transverse to the direction of the lightwave propagation direction of the optical connection to be established between optical fiber 15 and the ferrule and optical fiber component 22.

FIG. 2B shows the positioning of plug housing 11 within the receptacle housing 18. The insertion of the plug housing 11 into the receptacle is stopped by a bottom wall of the receptacle housing 18 and a height of ferrule 17 is fixed correspondingly. After the plug 25 has been seated into the receptacle 24, knob 13 is released by bringing it back to an original position along the knob guidance groove 12 in which the sleeve 16 is biased toward package 23 by spring 14.

FIG. 2C shows the position after knob 13 has been released. In this position, ferrule 17 of the plug 25 is physically contacted and optically connected with the ferrule of the combined optical fiber and ferrule component 22. Sleeve 16 covers optical fiber 15 and becomes tapered to smoothly guide and receive the ferrule of the component 22. The ferrule 17 is pushed longitudinally forward or toward the ferrule of the optical fiber with ferrule component 22 by a spring 14 that holds the ferrules together by a force sufficient to achieve the contact pressure required to realize the optical connection.

After the optical connection has been established, the plug can still be readily detached from the receptacle by pulling back on the knob 13 and guiding it into the knob guidance groove 12. By this action, the sleeve 16 is stored completely and fixed in the plug housing 11. Thereafter, the plug housing 11 can be pulled upwardly from the receptacle housing 18 to detach the plug 25 from the receptacle 24.

With respect to the embodiment of the present invention, the optical connection loss resulting from the detachable structure is within 0.5 dB. This optical connection loss does not deteriorate even after 100 times of repetitive detachment of the plug 25 and the receptacle 24. An optical return loss could be kept greater than −40 dB.

Even if the parts are reversed with respect to the plug and receptacle sides of the module, in which case sleeve 16 would be attached with the optical fiber and ferrule 22, the aforementioned effect would be obtained. Although the structure of the guidance mechanism attached to the plug housing 11 and the receptacle housing 18 is shown with a smooth walled structure, when there is provided a guidance mechanism for meshing each other, the same effect can be obtained. Although the embodiment of the present invention is an example of the optical transmission module or optical module, the present invention can be used as well for the optical connection of optical fibers.

Figure 3:
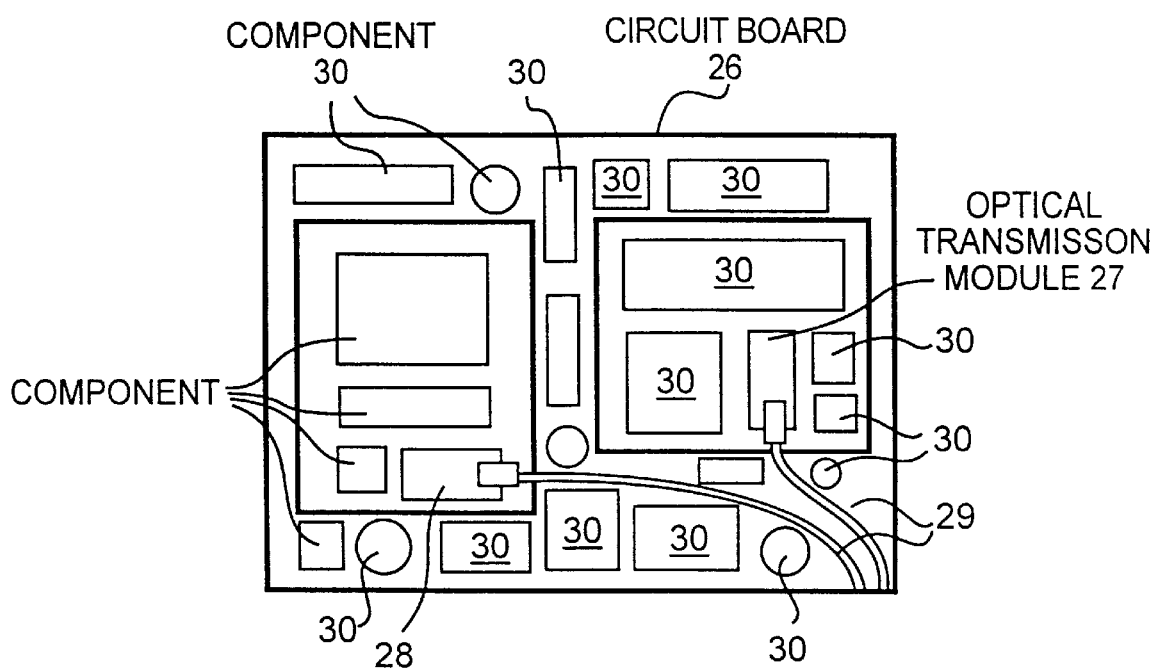
FIG. 3 shows a circuit diagram of a circuit board with an optical transmission module or an optical module of the present invention mounted thereon.

FIG. 3 shows an example circuit diagram of a circuit board having an optical transmission module or an optical module relating to the present invention mounted thereof.

Optical transmission modules or optical modules 27 and 28 are mounted on a circuit board 26 and optical fibers 29 are connected thereto. A plurality of electronic components 30 are placed on the circuit board 26. Because the optical fibers can be detached from the receptacles of the modules in the vertical direction, the optical transmission modules or optical modules 27 and 28 relating to the present invention can have electronic components 30 assembled peripherally around them. Accordingly, the present invention does not require a free space along the surface of the circuit board to detach the optical connector in the conventional manner and it is possible to perform a high density surface mounting on the circuit board. Therefore, a cost reduction in the mounting of the components can be realized. Further, since it is possible to mount the optical transmission module or optical module of the invention on the central area of the mounting board, a board design of a wide range can be made available. Because the connector portion of the optical transmission module or optical module has a configuration that enables the optical fiber to be detached in the vertical direction above the module, the configuration is applicable to an optical transmission module or an optical module having a low height profile.

Based on the present invention, an optical transmission module or an optical module optimum for high density mounting can be acquired.

While a preferred embodiment of the present invention has been described in detail, with variations and modifications, further embodiments, variations and modifications are contemplated within the broader aspects of the present invention, in addition to the advantageous details, in accordance with the spirit and scope of the following claims.

What is claimed is:

1. An optical transmission module or an optical module, comprising:
   an optical component package having an optical component;
   a receptacle at one end or one side of said optical module adjacent said optical component package having an upwardly facing open area; and
   a plug connected to a optical fiber that is detachably connected to said receptacle by insertion of said plug in a downwardly extending insertion direction through said upwardly facing open area to seat said plug within said receptacle for optically coupling said optical fiber to said optical component.

2. The optical transmission module or optical module of claim 1, wherein said plug has a housing having an outer periphery of a predetermined shape and said upwardly facing open area of said receptacle has a configuration that matches said predetermined shape of said plug housing.

3. The optical transmission module or optical module of claim 2, wherein said predetermined shape of said outer periphery of said plug housing is cross-shaped.

4. The optical transmission module or optical module of claim 1, wherein said optical fiber extends in a direction transverse to said insertion direction of said plug and wherein said plug has a mechanism that moves said optical fiber toward and away from a position in which said optical fiber is coupled with said optical component.

5. The optical transmission module or optical module of claim 4, further including said plug having a first ferrule connected to the optical fiber, said optical component package having a second ferrule, said plug having a spring for urging said first ferrule in contact with said second ferrule when said plug is seated within said receptacle, wherein said mechanism has a knob to manipulate movement of said first ferrule away from said second ferrule during insertion and removal of said plug to prevent contact between said first and second ferrules.

6. An optical module, comprising:
   an optical component package having an optical component mounted on a substrate within said optical component package;
   a receptacle at one end or one side of said optical module having an open top area, a bottom wall and opposed side walls;
   a plug connected to an optical fiber that is detachably connected to said receptacle by insertion of said plug in a direction extending downwardly through said open top area from above said receptacle; and
   an optical coupling from said optical fiber to said optical component passing through said plug and said receptacle in a direction of lightwave propagation that is transverse to said insertion direction.

7. The optical module of claim 6, wherein one of said two side walls is adjacent said optical component package and another of said two side walls is opposed to said one side wall.

8. The optical module of claim 6, wherein said bottom wall of said receptacle fixes a height of said plug with respect to said receptacle for aligning said optical coupling.

9. An optical connector, comprising:
   a first optical fiber;
   an optical module having a second optical fiber connected to an optical component;
   a receptacle at one end or one side of said optical module for connecting said first optical fiber to said optical module through said one end or one side, said receptacle having an upwardly facing open area; and
   a plug having housing in which a ferrule is connected to said first optical fiber, wherein said plug is detachably connected to said receptacle by insertion of said plug in a downwardly extending insertion direction through said upwardly facing open area to seat said plug within said receptacle for optically coupling said first optical fiber to said optical component through said second optical fiber.

10. The optical connector of claim 9, wherein said plug has a mechanism including a sleeve that moves with said ferrule and said first optical fiber toward and away from a first position in which said first optical fiber is coupled with said optical component.

11. The optical connector of claim 10, wherein said mechanism has a knob to manipulate the movement of said sleeve with said ferrule and said first optical fiber away from said first position during insertion and removal of said plug.

12. The optical connector of claim 11, wherein said mechanism further includes a spring for biasing said first optical fiber toward said position and a knob guidance groove formed in said housing of said plug for guiding and holding said knob in a second position away from said first position during insertion and removal of said plug.

13. An optical transmission device, comprising:
   a plug having a housing structure including within said housing: a knob, a first ferrule, a sleeve, a spring and a knob guidance groove;
   a first optical fiber connected to said first ferrule, said sleeve and said knob being fixed to said first ferrule and said spring being positioned between said housing and said knob for biasing said first ferrule toward a first position;

an optical package having a substrate, a second ferrule mounted on said substrate, an optical component mounted on said substrate and a second optical fiber connected to said second ferrule and mounted on said substrate;

a receptacle adjacent a side or end of said package;

said package having an opening through which said second ferrule is exposed for connection to said first ferrule in said first position;

said receptacle having an upwardly facing open area; and said plug being detachably connected to said receptacle by insertion of said plug in a downwardly extending insertion direction through said upwardly facing open area to seat said plug within said receptacle, wherein said first ferrule is moved to and held in a second position with said knob traveling in said knob guidance groove against the bias of said spring for insertion of said plug, and then returned to said first position for optically coupling said first and second ferrules.

14. The optical transmission device of claim 13, wherein said first and second optical fibers and said optical component are aligned in a lightwave propagation direction on said substrate of said package that is transverse to said direction of insertion of said plug.

15. The optical transmission device of claim 14, wherein said knob moves said optical fiber, said sleeve and said first ferrule together in the lightwave propagation direction.

16. The optical transmission device of claim 13, wherein said plug housing has an outer periphery of a predetermined shape and said upwardly facing open area of said receptacle has a configuration that matches said predetermined shape of said plug housing.

17. The optical transmission device of claim 16, wherein said predetermined shape of said outer periphery of said plug housing is cross-shaped.

* * * * *